United States Patent
Wang et al.

(10) Patent No.: US 7,460,174 B2
(45) Date of Patent: Dec. 2, 2008

(54) APPARATUS AND METHOD FOR DETECTING SYNCHRONIZATION SIGNAL OF DATA SIGNAL UTILIZING SYNCHRONIZATION SYMBOLS

(75) Inventors: Wei-Ting Wang, Taipei (TW);
Cheng-Yi Huang, I-Lan Hsien (TW);
Bao-Chi Peng, Taipei (TW)

(73) Assignee: Realtek Semiconductor Corp., HsinChu (TW)

( * ) Notice: Subject to any disclaimer, the term of this patent is extended or adjusted under 35 U.S.C. 154(b) by 587 days.

(21) Appl. No.: 11/160,557

(22) Filed: Jun. 29, 2005

(65) Prior Publication Data

US 2006/0001769 A1      Jan. 5, 2006

(30) Foreign Application Priority Data

Jul. 2, 2004 (TW) ................. 93120082 A

(51) Int. Cl.
*H04N 5/08* (2006.01)
*H04L 7/00* (2006.01)

(52) U.S. Cl. .................. 348/525; 375/368; 375/365

(58) Field of Classification Search ......... 348/525–535, 348/471, 472, 495; 375/365–368, 362
See application file for complete search history.

(56) References Cited

U.S. PATENT DOCUMENTS

| 4,868,853 | A | * | 9/1989 | Izumita et al. | ............... 375/362 |
| 5,594,506 | A | * | 1/1997 | Yang | ........................... 348/531 |
| 6,104,435 | A | | 8/2000 | Kim | |
| 6,731,711 | B1 | * | 5/2004 | Jun | ............................. 375/368 |

FOREIGN PATENT DOCUMENTS

EP          536657 A2 *   4/1993

* cited by examiner

*Primary Examiner*—M. Lee
(74) *Attorney, Agent, or Firm*—Winston Hsu

(57) ABSTRACT

A synchronization signal detector includes: a first circuit configured to delay the data signal by a period of at least one data segment of the data signal to generate a delayed signal; a second circuit configured to produce a plurality of similarity signals according to the data signal and the delayed signal, each of the similarity signals representing the similarity between the data signal and the delayed signal, and a third circuit configured to determine the synchronization signal of the data signal according to the similarity signals. The present invention further provides a method corresponding to the signal detector.

24 Claims, 3 Drawing Sheets

APPARATUS AND METHOD FOR DETECTING SYNCHRONIZATION SIGNAL OF DATA SIGNAL UTILIZING SYNCHRONIZATION SYMBOLS

BACKGROUND OF THE INVENTION

1. Field of the Invention

The present invention relates to a digital television system, and more particularly, to a synchronization signal detector and related method of the digital television system.

2. Description of the Prior Art

Due to the need for decoding a digital TV signal, the digital TV signal is designed to contain a fixed pattern, which appears repeatedly, to allow a digital TV receiver to synchronize the digital TV signal accordingly. Taking a digital TV signal used in the U.S.A. as an example, the digital TV signal complies with a specification defined by an Advanced Television Systems Committee (ATSC). According to the specification, each data field contains 313 segments, and the beginning of each segment corresponds to a four-symbol fixed pattern which is commonly called segment SYNC or data segment SYNC. For convenience, these four symbols will hereafter be called sync symbols.

The synchronization of the digital TV signal is achieved by identifying the sync symbol in the received digital TV signal through the aid of a reference signal containing the same sync symbol. Because of the interference caused by the noise or transmission path variations, however, the sync symbol in the received signal may in actuality differ from the sync pattern in the reference signal, which causes synchronization errors to occur due to the failure of identifying the sync symbol in the digital TV signal.

SUMMARY OF THE INVENTION

It is therefore one of the objectives of the present invention to provide a synchronization signal detector and related method for detecting a synchronization signal of a digital TV signal according to synchronization symbols of the digital TV signal, to solve the above-mentioned problem.

According to an exemplary embodiment of the claimed invention, an apparatus for detecting a synchronization signal of a data signal is disclosed. The apparatus includes: a first circuit configured to delay the data signal by a predetermined period to generate a delayed signal; a second circuit configured to produce a plurality of similarity signals according to the data signal and the delayed signal, each of the similarity signals representing the similarity between the data signal and the delayed signal; and a third circuit configured to determine the synchronization signal of the data signal according to the similarity signals.

The claimed invention provides a method of detecting a synchronization signal for a data signal. The method includes: delaying the data signal by a predetermined period to generate a delayed signal; comparing the data signal and the delayed signal to output a plurality of comparison values; outputting a plurality of similarity signals according to the comparison values, each of the similarity signals representing the similarity between the data signal and the delayed signal; and determining the synchronization signal of the data signal according to the similarity signals.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
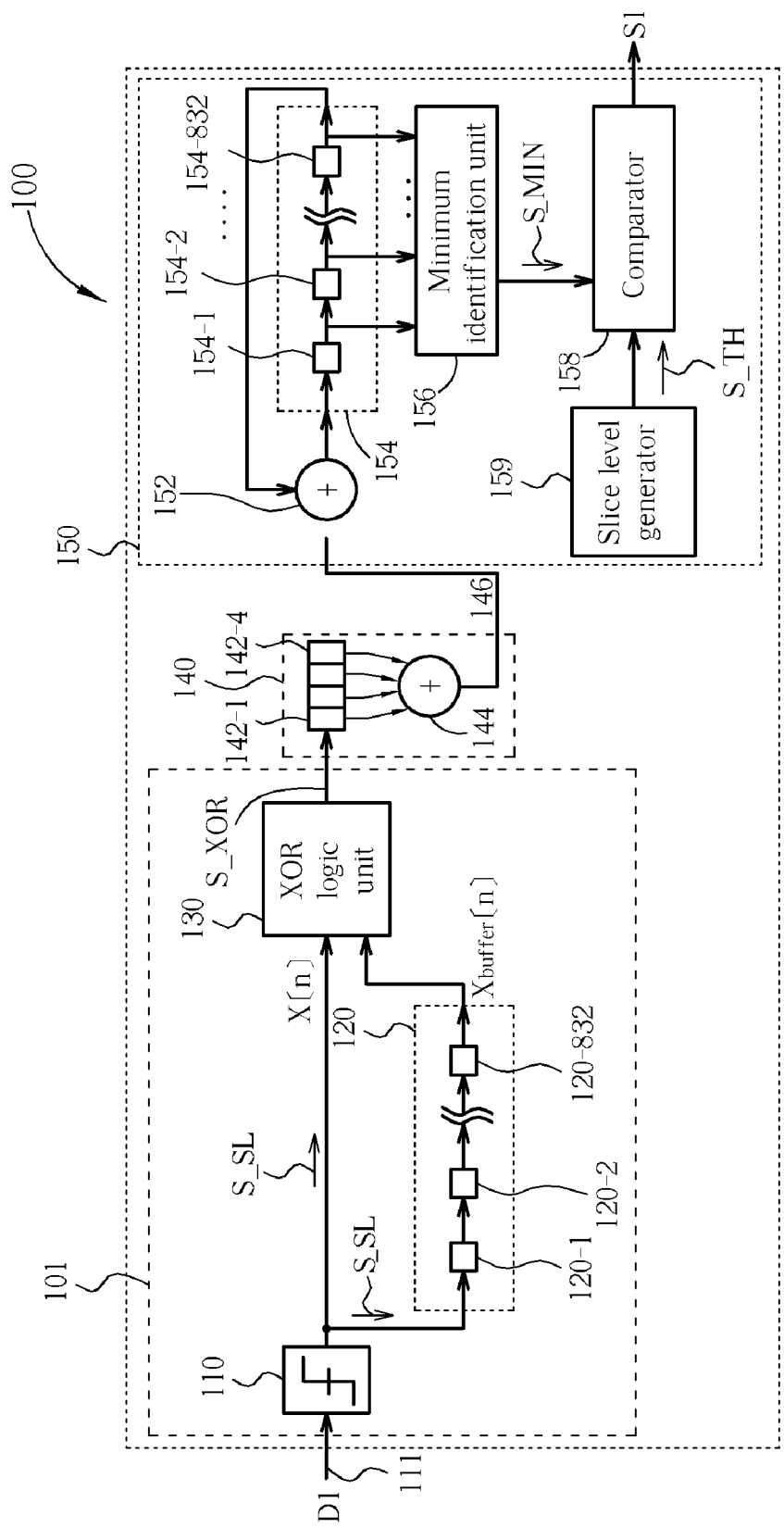
FIG. 1 is a diagram of a signal detector according to a first embodiment of the present invention.
Figure 2:
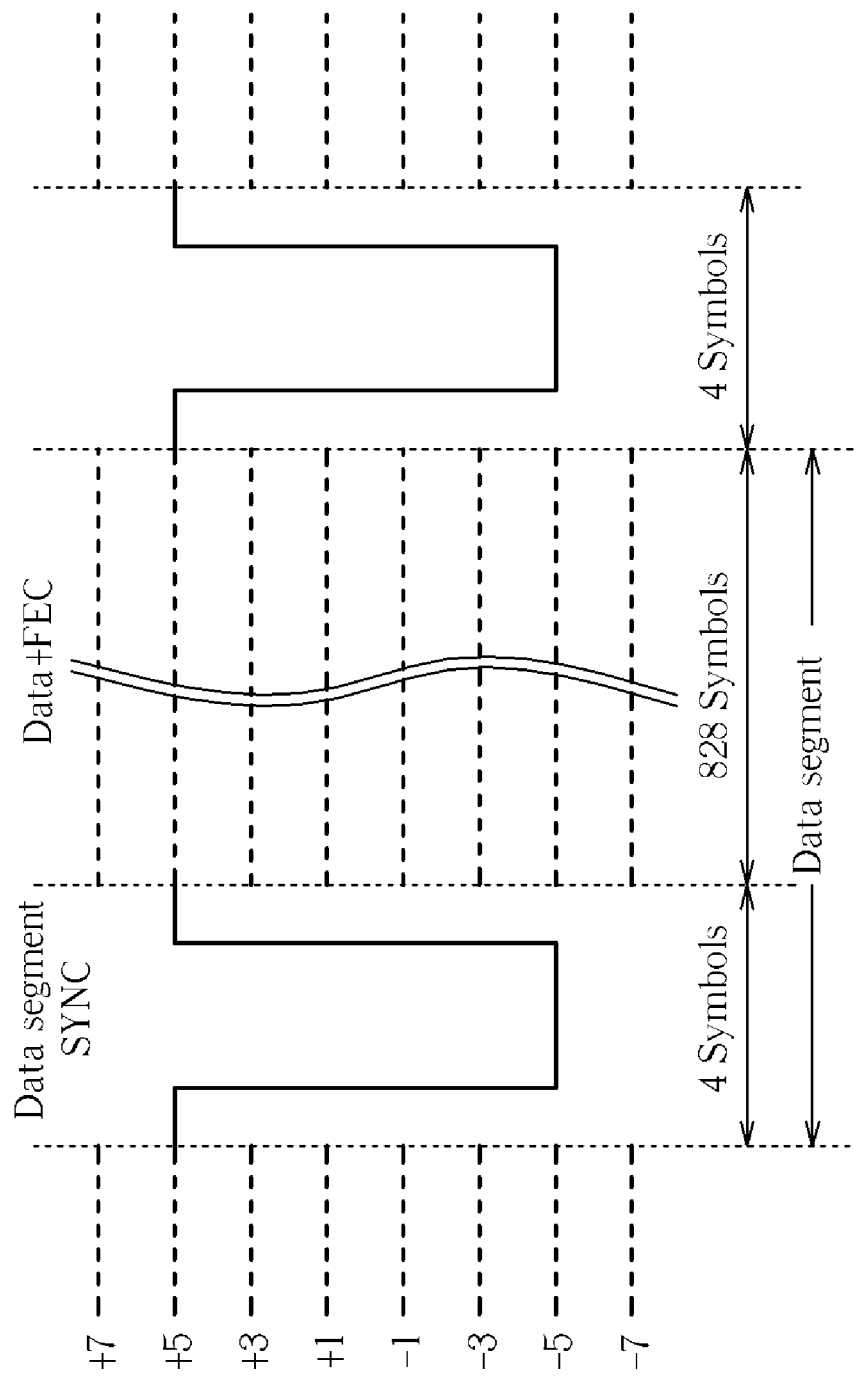
FIG. 2 is a diagram illustrating a signal format of a digital signal processed by the signal detector shown in FIG. 1.

Please refer to FIG. 1 and FIG. 2. FIG. 1 is a diagram of the signal detector 100 according to a first embodiment of the present invention, and FIG. 2 is a diagram illustrating a signal format of an input signal D1 processed by the signal detector 100 shown in FIG. 1. The digital signal D1, in this embodiment, is a digital TV signal D1 used in the U.S.A, which complies with the ATSC specification and is further called ATSC signal D1. The signal format of the ATSC signal D1 is well known, and further description is omitted here for brevity. Please note that the present invention also can be applied to digital signals defined by other specifications, or other kinds of digital signals.

According to a first embodiment of the present invention, the signal detector 100 is used to detect a synchronization signal S1 according to the digital signal D1. The digital signal D1 has a plurality of symbols and can be sorted into a plurality of segments as the "data segment" shown in FIG. 2. There are four sync symbols (segment SYNC) in each segment of the digital signal D1. As shown in FIG. 1, the signal detector 100 comprises a slicer 110, a buffering module 120, a symbol comparator 130, a symbol detector 140, and a decision unit 150. The buffering module 120 comprises a plurality of registers 120-1 to 120-832, cascaded orderly. Additionally, the decision unit 150 comprises an adder 152, a buffering module 154, a minimum identification unit 156, a comparator 158, and a slice level generator 159. The buffering module 154 comprises a plurality of registers 154-1 to 154-832 orderly cascaded in a series.

The operation of the signal detector 100 in this embodiment is detailed as follows. As shown in FIG. 1, after the digital signal D1 is inputted into the symbol comparison circuit 101, the slicer 110 converts the digital signal D1 into a binary signal S_SL according to a slice level. Every symbol in the binary signal S_SL has either a first logic value or a second logic value. In this embodiment, assume that the slice level is zero, the value of the digital signal D1 is represented by Y[n], and the value of the binary signal S_SL is represented by X[n]. Therefore, X[n] is expressed as follows.

$X[n]=0$, if $Y[n]>0$; or $X[n]=1$, otherwise.

Each symbol of the binary signal S_SL at the output of the slicer 110 corresponds to a bit. As shown in FIG. 2, the output of the slicer 110 corresponds to a high level when an incoming sync symbol corresponds to a high level, and the output of the slicer 110 corresponds to a low level when an incoming sync symbol corresponds to a low level. Therefore, the fixed pattern carried by the four sync symbols in the digital signal D1 is preserved in the binary signal S_SL, which can simplify the following operation and save the memory capacity needed in post-end buffers. In other words, the storage capacity allocated to the buffering modules 120, 154 can be reduced accordingly. The above-mentioned slicer 110 can be omitted here and still the functionality of the signal detector 100 can be achieved.

The segment delay circuit 120 delays the binary signal S_SL to generate a delayed signal whose value is represented by Xbuffer[n]. Here, the buffering module 120 is called the segment delay circuit 120 because the delay amount of the delay signal corresponds to at least one segment. In this embodiment, the segment delay circuit 120 can be viewed as an 832-bit shift register so that the value Xbuffer[n] of the delay signal is delayed by 832 symbols (one segment) relative to the value X[n] of the binary signal S_SL. The symbol comparator 130 compares the delayed signal with the binary signal S_SL to output the signal S_XOR, wherein the symbol comparison circuit 130 can be implemented by an XOR logic gate. When the output signal S_XOR is "0", it means that the values X[n], Xbuffer[n] of the binary signal S_SL and the delayed signal are the same. According to the signal format shown in FIG. 2, if there are four continuous "0"s in the output signal S_XOR, the value X[n] of the binary signal S_SL corresponds to the sync symbol. Therefore, the symbol detector 140 is used to detect if there are four continuous "0"s in the output signal S_XOR.

The symbol detector 140 comprises a plurality of registers 142-1 to 142-4 and an adder 144. The registers 142-1 to 142-4 buffer four continuous logic values while the adder 144 adds these buffered logic values for outputting a calculation result 146. When the calculation result 146 is equal to a minimum value (i.e., 0), it means that these four continuous logic values are "0"s. The symbol detector 140 outputs 832 successive calculation results to the registers 154-1 to 154-832 of the decision unit 150.

Due to the periodic appearance of the fixed pattern represented by the four sync symbols in every segment, there should be two minimum values spaced by an interval of one segment among calculation results 146 outputted from the symbol detector 140. When each of the registers 154-1 to 154-832 buffers a specific calculation result 146, the adder 152 starts accumulating every two calculation results 146 spaced by a segment, and generates 832 summation results corresponding to a specific segment. These 832 summation results are buffered in the buffering module 154. Among these 832 summation results, there is a minimum value which is exactly an accumulated result of minimum values of the plurality of calculation result values 146.

The minimum identification unit 156 in the decision unit 150 reads the buffered content of each of the registers 154-1 to 154-832 to identify a minimum value, and then outputs a signal S_MIN capable of acting as a synchronization signal. The combination of the adder 152, the register 154 and the minimum identification unit 156 can be viewed as a filter.

In a preferred embodiment, the minimum value output signal S_MIN is further inputted into a comparator 158. The comparator 158 compares the output signal S_MIN with a threshold S_TH provided by the threshold value generator 159, wherein if the signal S_MIN is less than the threshold S_TH, the comparator 158 will trigger a synchronization signal S1. The comparator 158 and the threshold value S_TH are used to lower the probability of error detection. Therefore, the decision unit 150 can generate the synchronization signal S1 through identifying the minimum of the plurality of calculation results 146 to acknowledge the starting point of each segment.

In another embodiment, these 832 registers 154-1 to 154-832 can also record the counts of the appearances of a minimum calculation result 146. Therefore, a count having the largest value is utilized to identify the starting point of each segment for generating the synchronization signal S1.

Figure 3:
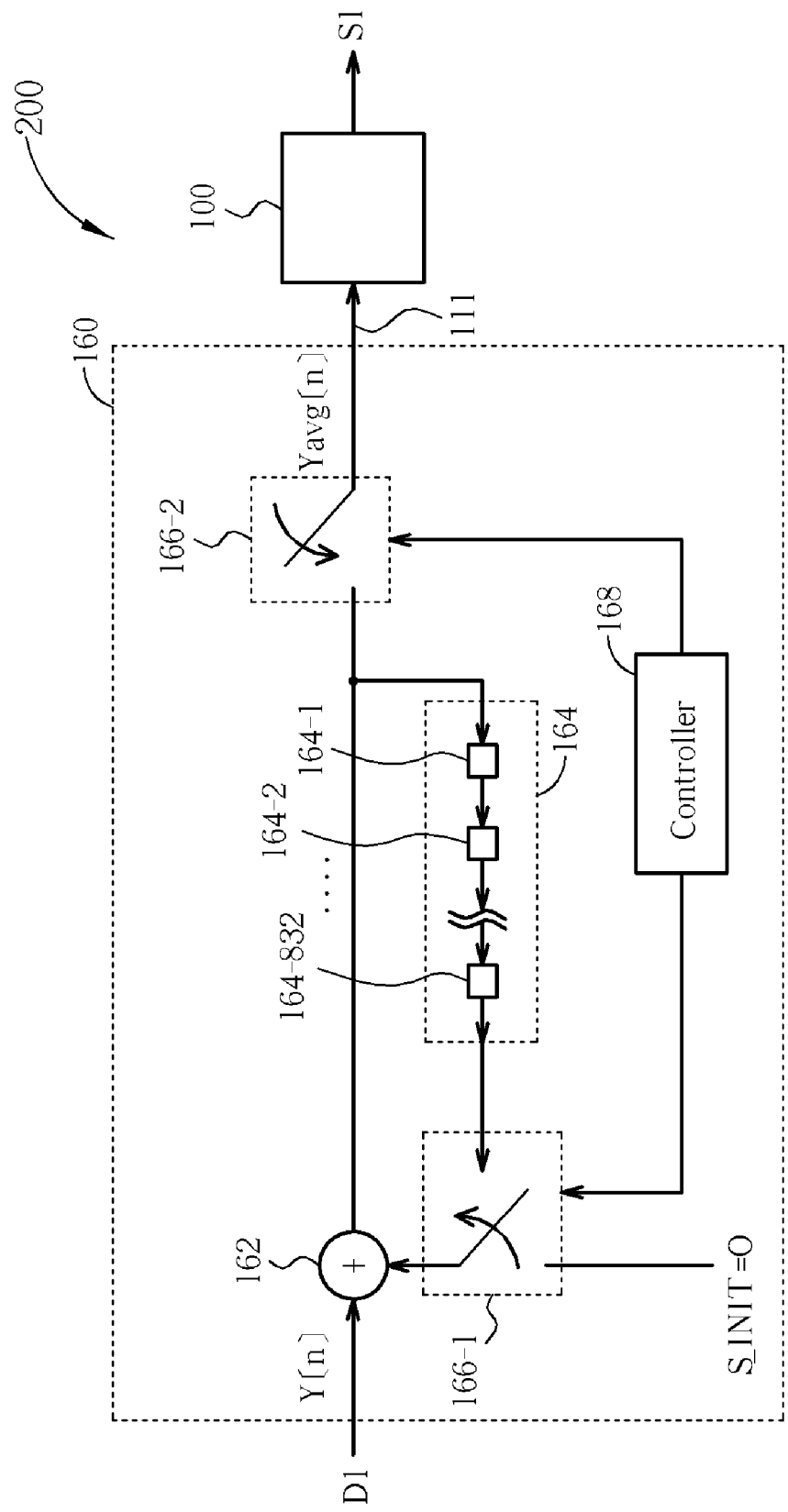
FIG. 3 is a diagram of a signal detector according to a second embodiment of the present invention.

Please refer to FIG. 1 in conjunction with FIG. 3. FIG. 3 is a diagram of a signal detector 200 according to a second embodiment of the present invention. The signal detector 200 is further equipped with a front stage processing module 160 used to update the digital signal D1 by accumulating every two symbols in the digital signal D1 spaced by a segment. In the second embodiment, the digital signal D1 is pre-processed by the front stage processing module 160. The front stage processing module 160 then outputs the pre-processed result Yavg[n] to the slicer 110. The front stage processing module 160 comprises a buffering module 164 to buffer a plurality of accumulated values, an adder 162 coupled to the buffering module 164 for accumulating two symbols spaced by a segment to generate one of a plurality of accumulated values, a switch 166-1 used for selectively coupling the adder 162 to either the buffering module 164 or an initial signal S_INT, a switch 166-2 used for selectively coupling the adder 162 and an input port of the slicer 110, and a controller 168 coupled to the switch 166-1 and switch 166-2 for controlling the on/off status of both switches 166-1 and 166-2.

Accordingly, the pre-processed result Yavg[n] of the front stage processing module 160 is equivalent to an accumulated value related to a sector within the original data Y[n] of the digital signal D1. Utilizing this additional data processing process, not only is the integrity of the fixed pattern strengthened, but also the noise interference affecting the digital signal D1 is alleviated.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for detecting a synchronization signal of a data signal, comprising:
    a first circuit configured to delay the data signal by a predetermined period to generate a delayed signal;
    a second circuit configured to compare the data signal and the delayed signal to output a plurality of comparison values;
    a third circuit configured to produce a plurality of similarity signals according to the comparison values, each of the similarity signals representing the similarity between the data signal and the delayed signal; and
    a fourth circuit configured to determine the synchronization signal of the data signal according to the similarity signals;
    wherein each of the similarity signals is a summation of a plurality of adjacent comparison values of the comparison values.

2. The apparatus of claim 1, further comprising:
    a fifth circuit configured to convert the data signal into a binary signal according to a slice level.

3. The apparatus of claim 1, wherein the second circuit comprises an XOR logic unit.

4. The apparatus of claim 1, wherein the third circuit comprises a four-bit buffer and an adder.

5. The apparatus of claim 1, wherein the fourth circuit comprises: a buffering module, coupled to the third circuit, for storing the similarity signals; and
    an extreme identification unit, coupled to the buffering module, for selecting an extreme from the similarity signals, wherein the extreme is a location utilized for generating the synchronization signal of the data signal.

6. The apparatus of claim 5, wherein the buffering module farther comprises:
a plurality of registers; and
an adder for accumulating the similarity signals to respectively generate a plurality of accumulated values, and for storing each of the accumulated values in a corresponding register of the registers.

7. The apparatus of claim 5, wherein the fourth circuit farther comprises:
a comparator for comparing the extreme with a threshold to generate a comparison result and outputting the synchronization signal according to the comparison result.

8. The apparatus of claim 1, farther comprising:
a front stage processing module coupled to the first circuit for accumulating every two symbols which are one segment apart according to the data signal to update the data signal.

9. The apparatus of claim 8, wherein the front stage processing module farther comprises:
a second buffering module for storing a plurality of accumulated values; and
an adder coupled to the second buffering module for accumulating every two symbols which are one segment apart to generate one of the accumulated values.

10. The apparatus of claim 9, wherein the front stage processing module farther comprises:
a first switch for selectively coupling the adder to the second buffering module;
a second switch for selectively coupling the adder to the first circuit; and
a controller for controlling the first and second switches.

11. The apparatus of claim 1, wherein the data signal complies with an Advanced Television Systems Committee (ATSC) specification.

12. The apparatus of claim 1, wherein each of the comparison values representing whether the data signal is equivalent to the delayed signal or not.

13. A method for detecting a synchronization signal of a data signal, comprising:
delaying the data signal by a predetermined period to generate a delayed signal;
comparing the data signal and the delayed signal to output a plurality of comparison values;
outputting a plurality of similarity signals according to the comparison values, each of the similarity signals representing the similarity between the data signal and the delayed signal, wherein each of the similarity signals is a summation of a plurality of adjacent comparison values out of the comparison values; and
determining the synchronization signal of the data signal according to the similarity signals.

14. The method of claim 13, further comprising:
converting the data signal into a binary signal according to a slice level.

15. The method of claim 13, wherein the predetermined period is a period of at least one data segment of the data signal.

16. The method of claim 13, wherein the step of determining the synchronization signal further comprises:
selecting an extreme from the similarity signals, wherein the extreme represents a location utilized for generating the synchronization signal of the data signal.

17. The method of claim 13, further comprising:
accumulating every two symbols which are one segment apart according to the data signal to update the data signal.

18. An apparatus for detecting a synchronization signal of a data signal, comprising:
a first circuit configured to delay the data signal by a period of at least one data segment of the data signal to generate a delayed signal;
a second circuit configured to produce a plurality of similarity signals according to the data signal and the delayed signal, each of the similarity signals representing the similarity between the data signal and the delayed signal;
a buffering module, coupled to the second circuit, for storing the similarity signals: and
an identification unit, coupled to the buffering module, for selecting an extreme from the plurality of similarity signals, wherein the extreme is a location utilized for generating the synchronization signal of the data signal.

19. The apparatus of claim 18, farther comprising:
a front stage processing module coupled to the first circuit for accumulating every two symbols which are one segment apart according to the data signal to update the data signal.

20. The apparatus of claim 18, wherein the second circuit comprises a four-bit buffer and an adder.

21. A method for detecting a synchronization signal of a data signal, comprising:
accumulating two symbols which are one segment apart according to the data signal to update the data signal;
delaying the data signal by a predetermined period to generate a delayed signal;
comparing the data signal and the delayed signal to output a plurality of comparison values;
outputting a plurality of similarity signals according to the comparison values, each of the similarity signals representing the similarity between the data signal and the delayed signal; and
determining the synchronization signal of the data signal according to the similarity signals.

22. The method of claim 21, wherein each of the similarity signals is a summation of a plurality of adjacent comparison values out of the comparison values.

23. A method for detecting a synchronization signal of a data signal, comprising:
delaying the data signal by a predetermined period to generate a delayed signal;
comparing the data signal and the delayed signal to output a plurality of comparison values;
outputting a plurality of similarity signals according to the comparison values, each of the similarity signals representing the similarity between the data signal and the delayed signal; and
selecting an extreme from the plurality of similarity signals, wherein the extreme represents a location utilized for generating the synchronization signal of the data signal.

24. The method of claim 23, wherein each of the similarity signals is a summation of a plurality of adjacent comparison values out of the comparison values.

* * * * *